Patented Nov. 26, 1935

2,022,231

UNITED STATES PATENT OFFICE 2,022,231

PRESERVATION OF VEGETABLE-FIBER MATERIAL

Francis E. Cislak, Indianapolis, Ind., assignor to Peter C. Reilly, Indianapolis, Ind.

No Drawing. Application March 17, 1934, Serial No. 716,221

8 Claims. (Cl. 92—21)

It is the object of my invention to preserve fabricated vegetable-fiber material against both decay and insects.

Fabricated vegetable-fiber material may be of many forms and types, and made of many different varieties of vegetable fiber. It is perhaps most common in the form of wall-boards, made of various vegetable fibers, such as wood fibers, corn stalks, bagasse, etc.; although it may have various other forms than wall-boards.

In the manufacture of such fabricated vegetable-fiber material, I mix therewith a group of substances which co-operate to protect it against both decay and insects, such as termites. The individual materials which I use not only play their individual parts in the preservation, but they co-operate with one another to give added preservation over that which is obtainable by the individual ingredients. That is, when the individual materials are used separately as preservatives in making wall board, or other fabricated vegetable-fiber material, commercial products which are protected against both decay and insects, such as termites, are not obtainable; but by combining the protective materials, and the insecticidal properties of some of the materials with the fungicidal properties of others, I effectively obtain at relatively small expense a commercial and attractive wall board which is both insect-proof and fungi-proof.

My invention thus has three aspects; for it involves a new composite preservative material, a new process involving the application of that preservative material to the vegetable-fiber material during its manufacture, and a new treated vegetable-fiber material.

My new preservative material includes inorganic and organic components.

The inorganic component is a toxic water-insoluble borate or borates, or materials which react in the presence of water to yield such a borate or borates. For instance, it may be zinc borate, cadmium borate, calcium borate, barium borate, iron borate, or copper borate, or a mixture of two or more of these; and of these I prefer zinc borate and cadmium borate. Instead of an actual borate or borates in the initial preservative material, I may use materials which will yield such a borate or borates by reaction in the presence of water; for water is ordinarily used in the manufacture of the fabricated vegetable-fiber material. Thus, for instance, instead of zinc borate, I may use zinc sulphate or zinc acetate, and borax, desirably in proportions to obtain a maximum yield of zinc borate. Similarly, instead of cadmium borate I may use cadmium sulphate or cadmium chloride, and borax; and instead of calcium borate I may use calcium acetate and borax; etc. I mention borax because it is a readily available source of the boric-acid radical; but other sources of that radical can also be used so long as they react with the desired metal to yield a water-insoluble borate.

The organic component may have one or both of the following sub-components:

I. One or more substances of the following class: acenaphthene, fluorene, anthracene, phenanthrene, carbazole;

II. A substance which is solid at 40° C., and which is water-insoluble when sub-component I is absent and desirably so in any case, and which is included in the following class: tar acids, chlorinated tar acids, nitrated tar acids, metal salts of tar acids or of chlorinated or nitrated tar acids.

In addition, naphthalene may be included.

A number of variants are possible within the scope of the appended claims, as will be clear from the following examples:

Example 1

| | Per cent |
|---|---|
| Cadmium borate | 20 to 40 |
| Naphthalene | 15 to 25 |
| Acenaphthene | 15 to 25 |
| Anthracene | 15 to 25 |
| Zinc dichloro-1, 3, 5-xylenol | 5 to 25 |

Example 2

| | Per cent |
|---|---|
| Zinc sulphate and borax mixture | 20 |
| Naphthalene | 20 |
| Anthracene | 20 |
| Acenaphthene | 20 |
| Dichloro-o-cresol | 10 |
| Dichloro-1, 3, 5-xylenol | 10 |

Example 3

| | Per cent |
|---|---|
| Zinc acetate | 18 |
| Borax | 22 |
| Fluorene | 20 |
| Naphthalene | 20 |
| β-naphthol | 10 |
| 1, 3, 5-xylenol | 10 |

Example 4

| | Per cent |
|---|---|
| Calcium borate | 30 to 40 |
| Naphthalene | 10 to 20 |
| Anthracene | 15 to 25 |
| Phenanthrene | 5 to 10 |
| Carbazole | 5 to 10 |
| Sodium o-phenylphenate | 10 to 20 |

Example 5

| | Per cent |
|---|---|
| Zinc sulphate | 29 |
| Borax | 31 |
| Calcium dichloro-o-cresol | 40 |

Example 6

| | Per cent |
|---|---|
| Zinc borate | 25 to 35 |
| Anthracene | 25 to 35 |
| Fluorene | 25 to 35 |
| Naphthalene | 5 to 15 |

Example 7

| | Per cent |
|---|---|
| Zinc borate | 15 |
| Cadmium borate | 15 |
| Acenaphthene | 40 |
| Calcium dichloro-o-cresol | 30 |

Example 8

| | Per cent |
|---|---|
| Zinc borate | 20 to 40 |
| Acenaphthene, fluorene, anthracene, phenanthrene, and carbazole, in any desired proportions among themselves, or one or more of such substances, with some naphthalene if desired, to a total amount of | 30 to 50 |
| Calcium dichloro-p-cresol | 25 to 35 |

Other variants may also be made, but the examples given show the general character of those variants, and the claims define the scope of this invention.

In all the compositions, the ingredients are solid at ordinary temperatures—say at 40° C. or below—and the compositions are formed by mixing the various ingredients thereof in solid form; with suitable grinding, usually both before and after the mixing. If desired, the organic ingredients may in many instances be melted together, and subsequently ground for mixing with the inorganic component.

The ground mixture is then used as a preservative for the vegetable-fiber material by being mixed therein as such vegetable-fiber material is manufactured—as to form wall-boards. Such vegetable-fiber material may be of any desired character, prepared in any desired way. This practically universally involves the use of the vegetable fiber in finely divided state in water. To this watery mass my preservative material is added in powdered form, and thoroughly mixed so that my preservative material will be embodied throughout the mass. Thereafter the vegetable-fiber material, containing my preservative material, is formed and dried in any suitable manner; and the dry fabricated vegetable-fiber material has my preservative material embodied through it.

My preservative material may be used in varying amounts, depending upon conditions to be encountered. For instance, it is effective in quantities ranging from 0.5% to 5.0% of the weight of the dry vegetable-fiber material.

It is found in use that such vegetable-fiber material is effectively preserved, against both decay and insects. The preservation is even effective against termites, which are exceedingly destructive to untreated vegetable-fiber material, as well as against the decay due to various fungus organisms.

I claim as my invention:—

1. Fabricated vegetable-fiber material through which is embodied one or more fungicidal water-insoluble borates, and one or more of the following substances: acenaphthene, fluorene, anthracene, phenanthrene, carbazole, a tar acid which is solid at 40° C. and which may be either chlorinated or nitrated, and metal salts of such tar acids.

2. A fabricated vegetable-fiber material through which is embodied zinc borate, fluorene, anthracene, and a metal salt of a chlorinated cresol.

3. A fabricated vegetable-fiber material through which is embodied zinc borate, and one or more of the following substances: acenaphthene, fluorene, anthracene, phenanthrene, carbazole, a tar acid which is solid at 40° C. and which may be either chlorinated or nitrated, and metal salts of such tar acids.

4. A fabricated vegetable-fiber material through which is embodied zinc borate, and a metal salt of a chlorinated tar acid.

5. The method of mixing with vegetable-fiber material during manufacture of a vegetable-fiber article a fungicidal and insecticidal composition of matter comprising a fungicidal water-insoluble borate, or materials which react in the presence of water to yield such a borate, and one or more of the following substances: acenaphthene, fluorene, anthracene, phenanthrene, carbazole, a tar acid which is solid at 40° C. and which may be either chlorinated or nitrated, and metal salts of such tar acids.

6. The method of mixing with vegetable-fiber material during manufacture of a vegetable-fiber article zinc borate, fluorene, anthracene, and a metal salt of a chlorinated cresol.

7. The method of mixing with vegetable-fiber material during manufacture of a vegetable-fiber article zinc borate, and one or more of the following substances: acenaphthene, fluorene, anthracene, phenanthrene, carbazole, a tar acid which is solid at 40° C. and which may be either chlorinated or nitrated, and metal salts of such tar acids.

8. The method of mixing with vegetable-fiber material during manufacture of a vegetable-fiber article zinc borate and a metal salt of a chlorinated tar acid.

FRANCIS E. CISLAK.